United States Patent [19]

Mori et al.

[11] Patent Number: 4,933,841

[45] Date of Patent: Jun. 12, 1990

[54] MICROCODE READING CONTROL SYSTEM

[75] Inventors: Tsuyoshi Mori, Ayase; Seishi Okada, Kawasaki, both of Japan

[73] Assignee: Fujitsu Limited, Kawasaki, Japan

[21] Appl. No.: 204,749

[22] Filed: Jun. 10, 1988

[30] Foreign Application Priority Data

Jun. 19, 1987 [JP] Japan ................... 62-154025

[51] Int. Cl.$^5$ ............... G06F 9/22; G06F 9/30; G06F 9/38
[52] U.S. Cl. .................. 364/200; 364/261.3; 364/261.7; 364/262.4; 364/262.8
[58] Field of Search ... 364/200 MS File, 900 MS File

[56] References Cited

U.S. PATENT DOCUMENTS

| | | | |
|---|---|---|---|
| 4,112,489 | 9/1978 | Wood | 364/200 |
| 4,179,737 | 12/1979 | Kim | 364/200 |
| 4,200,927 | 4/1980 | Hughes et al. | 364/200 |
| 4,594,659 | 6/1986 | Guenthner et al. | 364/200 |
| 4,597,044 | 6/1986 | Circello | 364/200 |
| 4,691,277 | 9/1987 | Kronstadt et al. | 364/200 |
| 4,757,445 | 7/1988 | Zolnowsky et al. | 364/200 |

*Primary Examiner*—David Y. Eng
*Attorney, Agent, or Firm*—Staas & Halsey

[57] ABSTRACT

A microcode reading control system in an information processing system wherein a machine instruction is divided into microcode instructions as a plurality of steps, each step is further divided into a plurality of stages, and the stages of the microcode instructions are processed in parallel with advanced retrieval control, a first aspect of which provides duplexed control storages storing the microcode instructions read in at a first step of the machine instruction, one of the control storages being read only at the first step of a branch target machine instruction of a branch machine instruction, and a second aspect of which provides a first control storage storing microcode instructions to control the first steps of the machine instructions and a second control storage storing microcode instruction to control the second steps and thereafter of the machine instructions, the first control storage reading the stored microcode instruction at the second stage of the first step of the machine instruction, and the second control storage reading at the first stage of the second step and thereafter of the machine instructions. Thus, in a processing of the branch machine instruction, the control can be accelerated.

8 Claims, 8 Drawing Sheets

| | D | A | M | E |
|---|---|---|---|---|
| • WHEN FIRST MICRO STEP IS CONTROLLED | • MACHINE INSTRUCTION DECODE<br><br>• MICROCODE READ FOR CONTROLLING FIRST MICRO STEP | • ADDRESS CALCULATION FOR MEMORY ACCESSING<br><br>• STORED DATA READ FROM GENERAL REGISTER UPON STORING IN MEMORY | • MEMORY ACCESS<br><br>• OPERAND DATA READ FROM GENERAL REGISTER | • STORAGE OF CALCULATION & RESULTS THEREOF TO GENERAL REGISTER<br><br>• BRANCH CONDITION DECISION |
| • WHEN nTH MICRO STEP IS CONTROLLED (n ≠ 1) | • MICROCODE READ FOR CONTROLLING nTH MICRO STEP | | | |

Fig. 1

| | D | A | M | E |
|---|---|---|---|---|
| ○ WHEN FIRST MICRO STEP IS CONTROLLED | ○ MACHINE INSTRUCTION DECODE<br><br>○ MICROCODE READ FOR CONTROLLING FIRST MICRO STEP | ○ ADDRESS CALCULATION FOR MEMORY ACCESSING<br><br>○ STORED DATA READ FROM GENERAL REGISTER UPON STORING IN MEMORY | ○ MEMORY ACCESS<br><br>○ OPERAND DATA READ FROM GENERAL REGISTER | ○ STORAGE OF CALCULATION & RESULTS THEREOF TO GENERAL REGISTER<br><br>○ BRANCH CONDITION DECISION |
| ○ WHEN nTH MICRO STEP IS CONTROLLED (n ≠ 1) | ○ MICROCODE READ FOR CONTROLLING nTH MICRO STEP | | | |

| TIME | T1 | T2 | T3 | T4 | | | |
|---|---|---|---|---|---|---|---|
| INST. 1 { | $D_{11}$ | $A_{11}$ | $M_{11}$ | $E_{11}$ | | | |
| INST. 2 { | | $D_{21}$ | $A_{21}$ | $M_{21}$ | $E_{21}$ | | |
| | | | $D_{22}$ | $A_{22}$ | $M_{22}$ | $E_{22}$ | |
| | | | | $D_{23}$ | $A_{23}$ | $M_{23}$ | $E_{23}$ |
| INST. 3 { | | | | $D_{31}$ | $A_{31}$ | $M_{31}$ | $E_{31}$ |
| | | | | | $D_{32}$ | $A_{32}$ | $M_{32}$ $E_{32}$ |
| INST. 4 { | | | | | $D_{41}$ | $A_{41}$ | $M_{41}$ |

Fig. 4B

| TIME | T1 | T2 | T3 | T4 | | | |
|---|---|---|---|---|---|---|---|
| BRANCH INST. | $D_1$ | $A_1$ | $M_1$ | $E_1$ | | | |
| NEXT INST. 1 | | $D_2$ | $A_2$ | $M_2$ | $E_2$ | | |
| NEXT INST. 2 | | | $D_3$ | $A_3$ | $M_3$ | $E_3$ | |
| NEXT INST. 3 | | | | $D_4$ | $A_4$ | $M_4$ | $E_4$ |
| BRANCH TARGET INST. | | | | $D_t$ | $A_t$ | $M_t$ | $E_t$ |
| | | | | | $D_t'$ | $A_t'$ | $M_t'$ $E_t'$ |

MICROCODE READING CONTROL SYSTEM

BACKGROUND OF THE INVENTION (1) Field of the Invention

The present invention relates to an instruction executing control system controlled by a microprogram in an information processing equipment, particularly to a microcode reading control system with an advanced control.

(2) Description of the Realted ARt

A machine instruction in an information processing equipment is usually executed by the following steps. Namely, the machine instruction is read from a main storage in response to an address indicated by an instruction counter, the maching instruction is decoded, various controls are exeucted corresponding to the decoded instruction, and the instruction counter is increased by a length of the machine instruction.

Since the machine instructins are stored in the main storage device in the processing sequence, when the machine instructions are read, an address of the next machine instruction to be read can be anticipated.

Therefore, while the equipment is decoding and processing, at the same time the equipment can read the next machine instruction. That is, an advanced control operation is possible.

However, if a branch instruction is exeucted, since the content of the instruction counter is refreshed or overwritten, a problem arises in that the fetch of the instruction during advanced control operation becomes difficult.

The branch instruction is important and occurs frequently in the information processing equipment, and therefore, high speed processing of the branch instruction would greatly contribute to an improvement of the equipment performance.

Further, the information processing equipment wherein processing of a machine instruction is divided into steps, each to be executed by a microcode, and the process in each step is carried out by a pipeline process in a multi-stage manner, an advanced read of the microcode corresponding to the advanced reading of the machine instruction can be made.

Therefore, an effective microcode reading control system must be provided in the advanced reading control system when a branch instruction is processed.

SUMMARY OF THE INVENTION

An object of the present invention is to provide a microcode reading control system utilizing an advanced control wherein processing at a first stage or microcode instruction in a microcode program of first step of a general instruction which is read first does not interface with that of a first stage in a microcode program of a branch target instruction, the microcode reading of the first stage in the branch target instruction is accelerated, and the processing speed of the sytem is thus improved.

In a first aspect of the present invention, there is provided a microcode reading control system comprising a first instruction register for holding a machine instruction, a first control storage device for storing at least one microcode instruction corresponding to each machine instruction, a pipeline processor for processing stages of the microcode instruction in parallel with a step of another microcode instruction, a second instruction register for holding a prefetched branch target machine instruction, a second control storage device for storing at least a first microcode instruction for each machine instruction, and selection means.

The first control storage device is accessed by an address from a portion of the machine instruction held in the instruction register. The pipeline processor, wherein each microcode instruction is processed sequentially in a plurality of processing stages, prefetches a branch target machine instruction at a stage prior to a stage at which a branch condition is decided in a microcode processing of the branch instruction. The second control storage device is accessed by an address from a portion of the branch target machine instruction held in the second instruction register. In the second control storage device, access to the second control storage device by the branch target machine instruction and access to the first control storage device by the machine instruction following the branch instruction are processed in parallel. The selection means selects one of the microcodes being read from the two control storage devices when a branch condition of the branch instruction is decided.

In a second aspect of the present invention, there is provided a microcode reading control system comprising a first instruction register for holding machine instruction, a second instruction register for holding a branch target instruction, a selection means for selecting either one of outputs from the first and second instruction registers, a first control storage device, a second control storage device, and a pipeline processor having a first register, a second register, and a third register connected in cascade.

The first control storage device receives an output of the selection means as an address and supplies stored microcode instructions corresponding to first steps of the machine instructions. The second control storage device receives the output of the selection means as an address and supplies stored microcode instructions corresponding to steps other than the first steps of the machine instructions. In the pipeline processor, the first register receives an output of the second control storage, and the second register receives an output of the first control storage. The process of each microcode comprises a first, a second, a third, and a fourth stage. The first stage instruction is given by the output of the selection means; the second stage instruction is given by the output of the first control storage or an output of the first register; the third stage instruction is given by an output of the second register; and the fourth stage instruction is given by an output of the third register.

By using the above systems, during the advanced control operation in the pipeline process, a process time is shortened by the time corresponding to a processing time for one stage when the branch instruction is exeucted.

DESCRIPTION OF THE PREFERRED EMBODIMENTS

Prior to the explanation of the embodiments of the invention, the related arts are explained in detail with reference to FIG. 1, FIG. 4A, and FIG. 4B.

Figure 1:
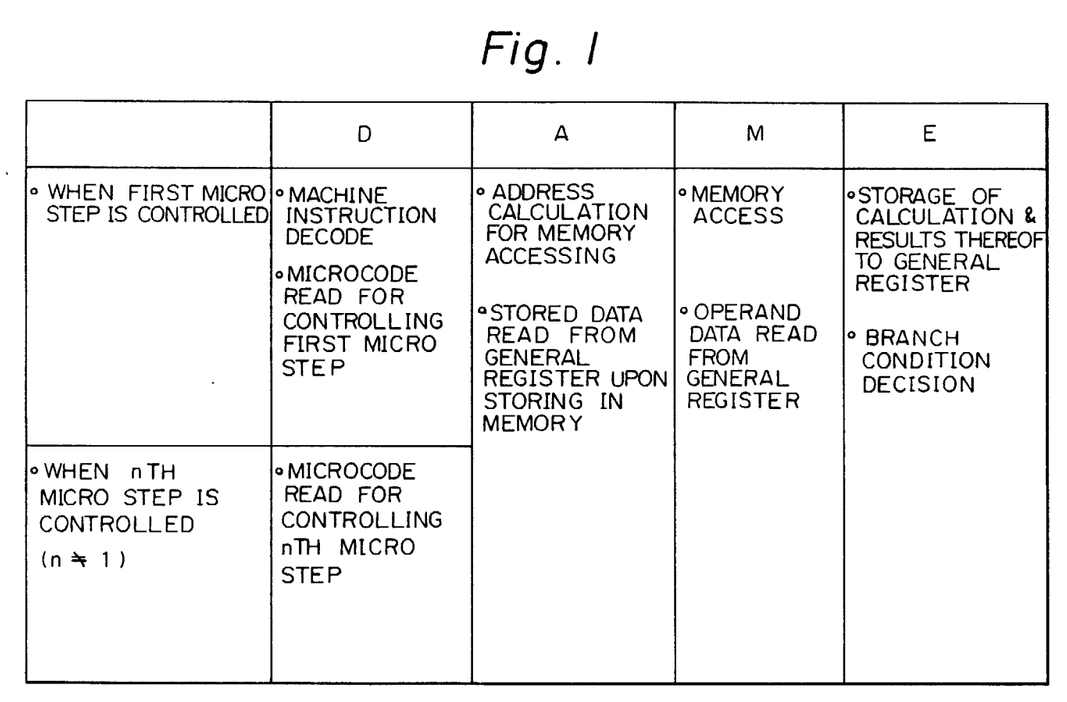
FIG. 1 is a drawing showing an example of the process at each stage in a process of a microcode instruction.

FIG. 1 shows an example of processing in each stage of a microcode instruction. FIGS. 4A and 4B are diagrams explaining microcode reading control with an advanced control operation capability. FIG. 4A shows the processes when executing a general machine instruction and FIG. 4B shows the processes when executing a branch instruction.

Figure 4A:
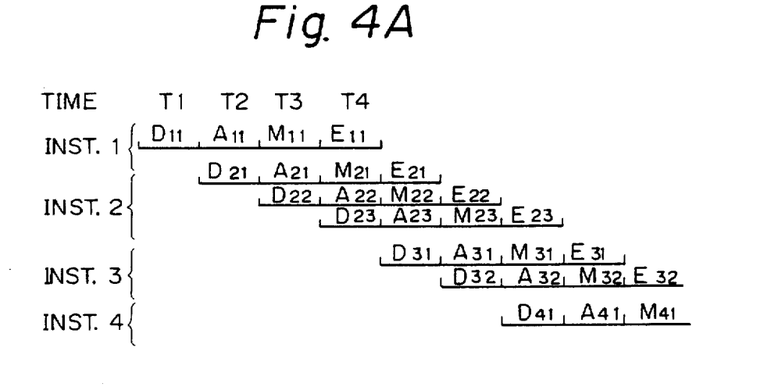
FIG. 4A is a diagram explaining microcode program reading control in a general instruction in the system in FIG. 3.
Figure 4B:
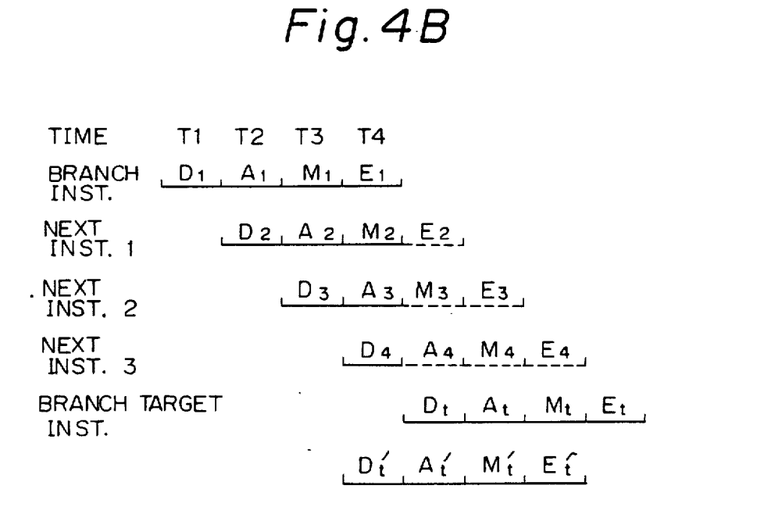
FIG. 4B is a diagram explaining the similar microcode reading control in a branch instruction.

It is assumed that, as shown in FIG. 1, FIGS. 4A and 4B, each microcode is processed in a four stage pipeline.

FIG. 1 shows the operations in each stage, i.e., D (decode), A (address calculation), M (memory access), and E (execution), of the microcode instruction. FIG. 4A shows the processes for executing the general machine instruction (hereinafter referred to only as instruction) using this microcode.

In FIG. 4A, a machine instruction 1 (Inst. 1) is executed by one microcode instruction, i.e., the instruction 1 is ended by the execution of one microcode instruction, instruction 2 is executed by three microcode instructions, and instruction 3 is executed by two microcode instruction.

In the above case, the branch machine instruction is processed as shown in FIG. 4B. Namely, as is clear from the operation in each stage shown in FIG. 1, the branch instruction process reads a microcode instruction corresponding to the branch instruction from the control storage at the stage D1, calculates an address of the branch target instruction at the next stage A1, fetches the branch target instruction at the stage M1, and decides a branch condition at the stage E1.

When the branch target machine instruction is selected by the decision of the branch condition in stage E1, the next instruction 1, 2, and 3 (NEXT INST. 1, 2, and 3) which are prepared for processing after execution of the branch instruction are stopped at the stages M2, A3, and D4, respectively. Then, the process in a stage Dt, which is a reading process of the microcide instruction in the branch target instruction, is initiated.

It is assumed, in FIG. 4B, that all instructions comprise only one microcode, respectively.

In addition, since the branch target machine instruction is fetched at the stage M1 of the branch machine instruction from the main storage, a read of the control storage at the time T4, simultaneously with the process of stage E1, is performed before the decision by the branch condition. This is shown in the stage Dt' in FIG. 4B.

By this control, the start of the branch target instruction is accelerated, and therefore, the processing time for the branch instruction is shortened.

Nevertheless, the read from the control storage at the stage D4 in the next instruction 3 interferes with the stage Dt', and as a result, it is difficult to avoid errors in the process.

If the stage D4 does not belong to a first step of the machine instruction, the interference between the stages D4 and Dt' does not occur because the control storage from which a microcode of the first step of the instruction is read is provided separately from another control storage from which the second step and thereafter is read, as disclosed in Japanese Unexamined Patent Publication (Kokai) No. 60-103452 entitled "Microprogram Control System" by the same applicant. But, if the stage D4 belongs to the first step in the machine instruction, interference will occur.

Embodiments according to the present invention are now explained with reference to the drawings. Note, in the figures, the same reference numerals denote the same objects.

Figure 2A:
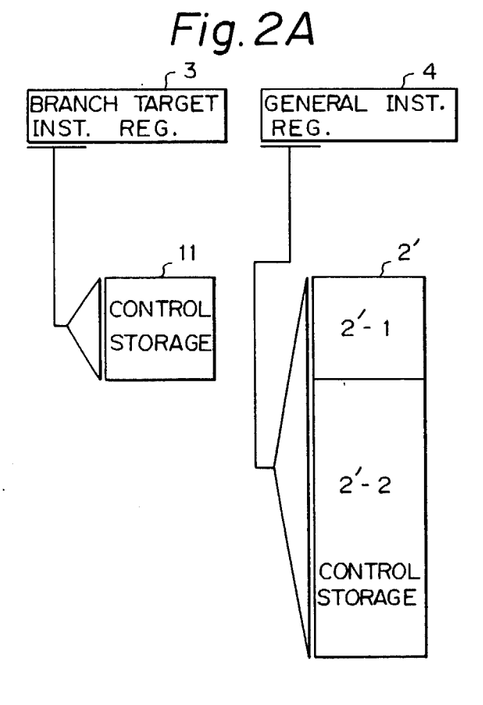
FIG. 2A is a schematic block diagram showing a microcode program reading control system according to a first embodiment of the invention.
Figure 2B:
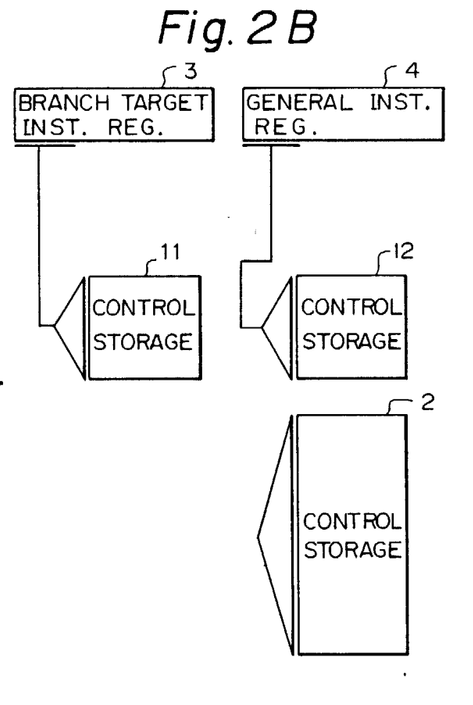
FIG. 2B is a schematic block diagram showing a modification of the system in FIG. 2A.
Figure 3:
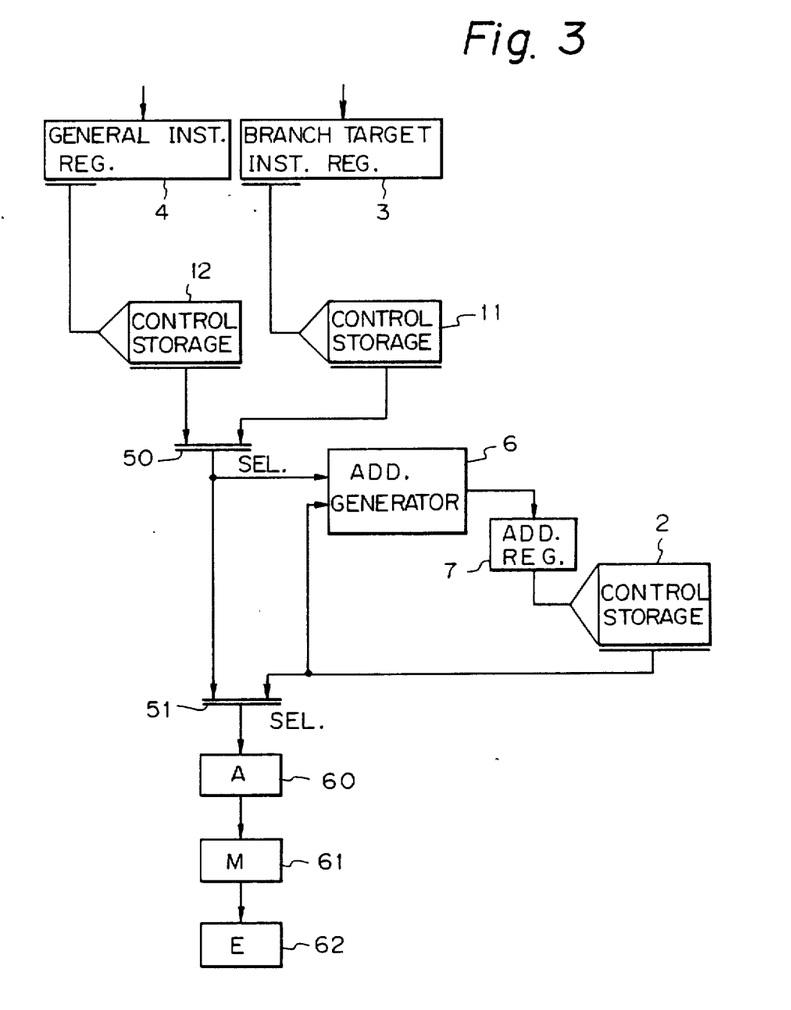
FIG. 3 is a detailed block diagram of the system in FIG. 2B.

A first embodiment of the invention is shown in FIGS. 2A, 2B, and 3.

In FIG. 2A, the apparatus comprises a control storage 2', another control storage 11, a general machine instruction register 4, and a branch target machine instruction register 3. The control storage 2' is the same as the conventional control storage. In this control storage 2', microcode instruction addressed at a first step in an instruction are stored in a portion 2'-1, and the other microcode instructions are stored in a portion 2'-2. Further, in this embodiment, the same microcode instructions stored in the control storage 2'-1 are stored in the control storage 11, which is read only at a first step of a branch target instruction.

On the other hand, as disclosed by Japanese Unexamined Patent Publication (Kokai) No. 60-103452, another system is provided whehrein a control storage 12 for a first step is prepared separately from a control storage 2 for a second step and thereafter. Namely, as shown in a schematic block diagram of FIG. 2B, a control storage 11 is provided which is the same as the control storage 12 for the first step, and is read only at the first sstep of a branch target instruction.

As above-mentioned, the control storage for the first step of the instruction is duplexed and one of the control storages is controlled to be read only in the first step of the branch target instruction.

The operation of the above system is explained by an example shown in FIG. 3, with reference to FIG. 4A and FIG. 4B.

A General machine instruction 1 is read from a main storage (not shown), the read information is then set in an instruction register 4, a stage D11 is executed at a time T1, a microcode instruction for the first step of the instruction 1 is read from the control storage 12, and the microcode instruction is set to a register A (60) through selectors 50 and 51.

At the next time T2, a stage A11 of the instruction 1, which includes the address calculation or the like for memory accessing, is executed, a stage D21 of the next instruction 2 is executed according to the contents of the register A(60), in the same way, the microcode instruction of the above-mentioned machine instruction 1 is shifted to a register M (61), and a microcode instruction for a first step of the instruction 2 is set in the register A (60).

The instruction 2 is executed by processing the three microcodes as mentioned above, and therefore, at a time T2, a micro-address generator 6 generates an address of the microcode instruction of the second step of the instruction 2 and the address is set in an address register 7.

At a time T3, according to the contents of the register M(61), a stage M11 of the machine instruction 1 is executed, which includes memory accessing or the like, a stage A21 of the first step of the machine instruction 2 is executed, microcode instructions of the instruction 1 are shifted to a register E (62), a microcode instruction of the first step of the instruction 2 is shifted to a register M(61), a microcode instruction of the second step of the instruction 2 is read from the control storage 2, i.e., execution of the stage D22, and the microcode instruction is set in the register A(60) through the selector 51. An address of a microcode instruction of a third step of the instruction 2 is then generated in the address generator 6 and is set in the address register 7.

At a time T4, a stage E11 of the machine instruction 1, a stage M21 of the first step of the instruction 2, and a stage A22 of the second step of the machine instruction 2 are execution in parallel, a microcode instruction of the third step of the instruction 2 is read from the control storage 2, i.e., execution of stage D23, and the microcode is set in the microcode register A(60). Thereafter, the advanced control of the instruction is performed in the same way.

The operation when a branch instruction is set in the instruction register 3 from the main storage device is now explained with reference to FIG. 4B.

Since the advanced control operation of the branch instruction, the next instruction 1, 2, 3, and the like, is carried out by the above-mentioned process, an explanation thereof is eleminated. This explanation concerns the execution of a branch target instruction in the branch machine instruction of at a time T4, as shown by Dt'.

Namely, at the time T4, a stage D4 of the first step of the next machine instruction 3 is executed and the microcode instruction is read from the control storage 12. But, in the branch machine instruction, at a time T3, a stage M1 is execution and the branch target instruction is set to the instruction register 3, and at the time T4, the microcode instruction is read from the control storage 11, i.e., a stage Dt' is executed. But, at the time T4, a branch condition is decided, and thus the selector 50 selects the information in the control storage 11 when executing the branch process and selects the information in the control storage 12 when not executing the branch process. Therefore, interference between the first steps of the general instruction and the branch target instruction as in the prior system does not occur.

Note, if the stage D4 of the instruction 3 belongs to a microcode instruction which has completed the second step, the microcode instruction of the step is read from the control storage 2. Then, the selector 51 selects the outputs of the control storage 2 and the read of the microcode of the first step of the branch target instruction, i.e., stage Dt', does not interfere with the stage D4.

A second embodiment of the present invention will now be explained, with reference to FIG. 5, FIGS. 6A, 6B, and 6C, with regard to the reading process of the microcodes.

Figure 5:
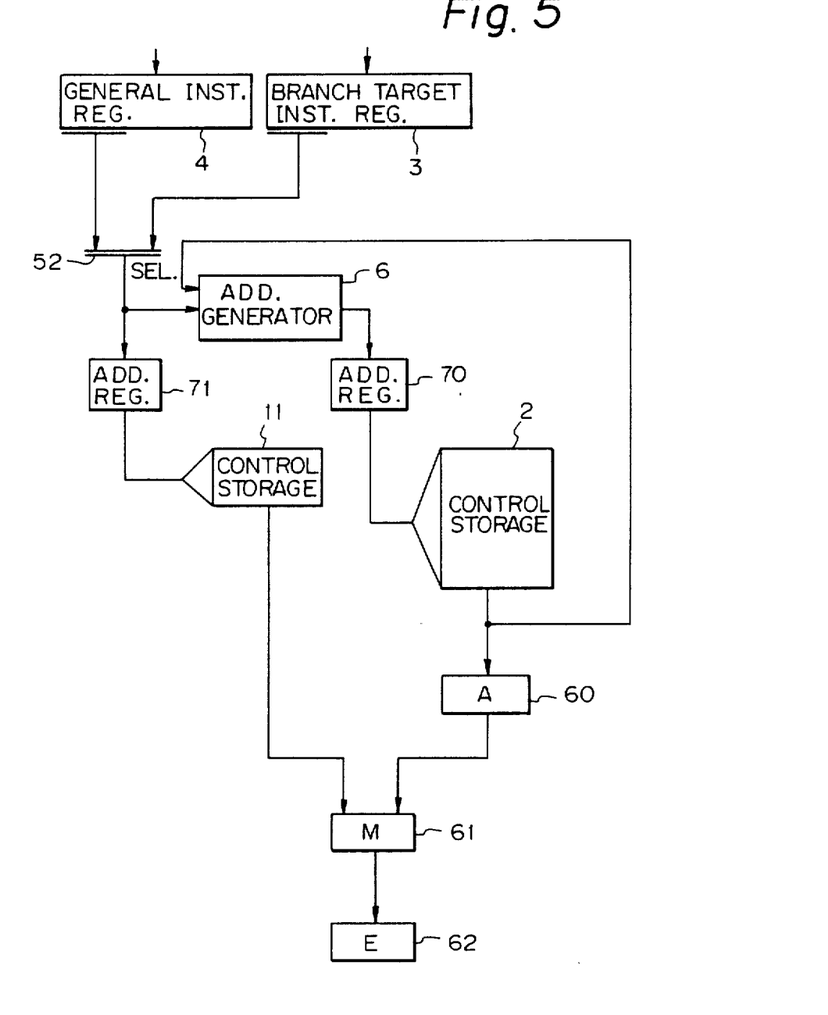
FIG. 5 is a detailed block diagram of a microcode program reading control system according to a second embodiment of the invention.

In this embodiment, the system comprises a general machine instruction register 4, a branch target machine instruction register 3, selector 52, an address generator 6, address registers 70 and 71, control storages 11 and 2, registers A(60), M(61), and E(62). The control storage 11 is a first control storage and reads the stored information at a first step of the microcode instruction, and the control storage 2 is a second control storage and reads the stored information at the second step and thereafter (conf. Japanese Unexamined Patent Publication (Kokai) No. 60-103452). The first control storage 11 is read at the second stage and thereafter of the first step, as shown by a bold line, and the second control storage 2 is read at the first stage of each step, as shown by a wavy line.

Figure 6A:
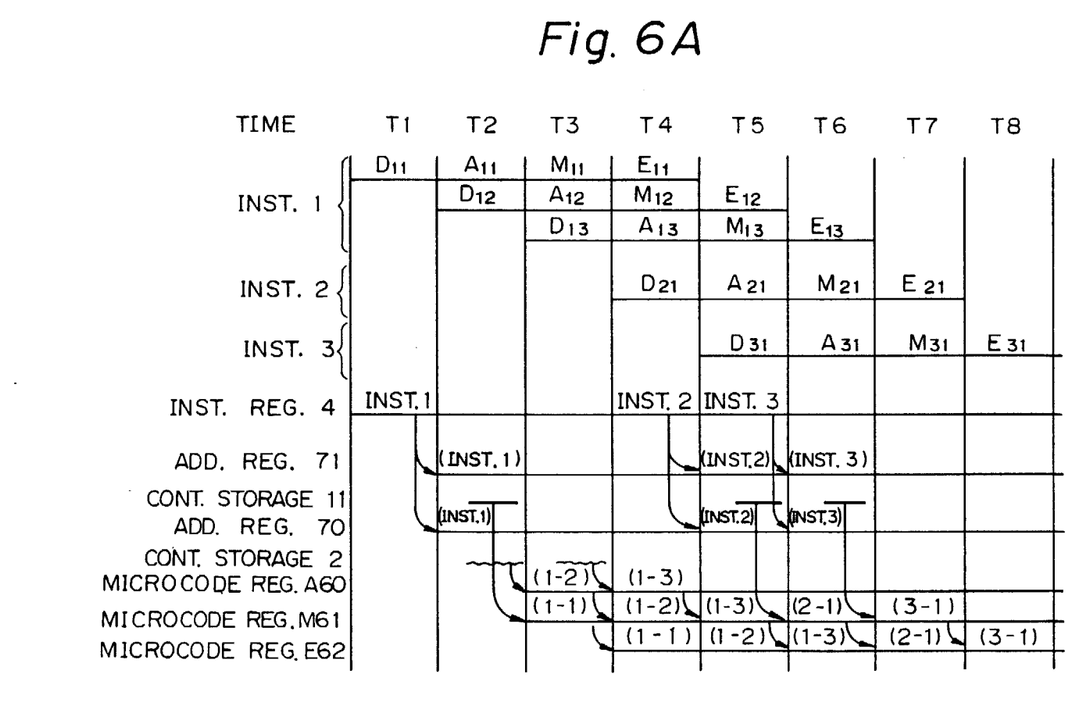
FIG. 6A, 6B, and 6C are diagrams explaining a microcode program reading control in the system in FIG. 5.

When the general machine instruction 1 is set in the instruction register 4, the stage D11 of the first step of the instruction 1 is executed (conf. time T1 in FIG. 6A).

In this stage, the instruction 1 is decoded, (in practice, an address of the first control storage 11 is generated). Namely, an address for reading the microcode instruction of the first step of the instruction 1 from the control storage 11 is set in an address register 71, and an address for reading the microcode of the second step from the control storage 2 is generated by the address generator 6 and provided to the address register 70.

An address generator is not provided at an input of the address register 71, since the first control storage 11 is read only at the first step of the instruction and thus the address is replaced by an operation code of the instruction.

At the next time T2, the stage A (stage A11) of the first step and the stage D (stage D12) of the second step are executed. In the stage A11, a microcode instruction (1-1) is read from the first control storage 11, as shown by a bold line, and the microcode is set in the microcode register M (61) to control the next stage.

In the above process, the address calculation, which essentially belongs to a stage A, may be controlled, for example, by using hardware instead of a microcode instruction.

In the process of the stage D12, a microcode instruction (1-2) of the second step of the microcode instruction 1 is read from the second control storage 2, as shown by a wavy line, and the microcode is set in the microcode register A(60). This process is a feature of the invention.

Subsequently, microcodes (1-1, 1-2), respectively set in the registers A(60) and M(61) are shifted to E(62) and M(61), and the process in each stage is executed.

Namely, at the next time T3, processes in stages A12 and M11 are executed in correspondence to the contents of the microcode registers A(60) and M(61), and simultaneously, stage D13 of the third step of the instruction 1 is executed. Then, a microcode instruction (1-3) is read from the second control storage 2, as shown by a wavy line, and is set to the microcode register A(60).

At the time T4, the stage D, i.e., stage D21, of the next instruction 2 is initiated and the stages A13, M12, and E11 are executed in the correspondence to the contents of the microcode registers A(60), M(61), and E(62).

Figure 6B:
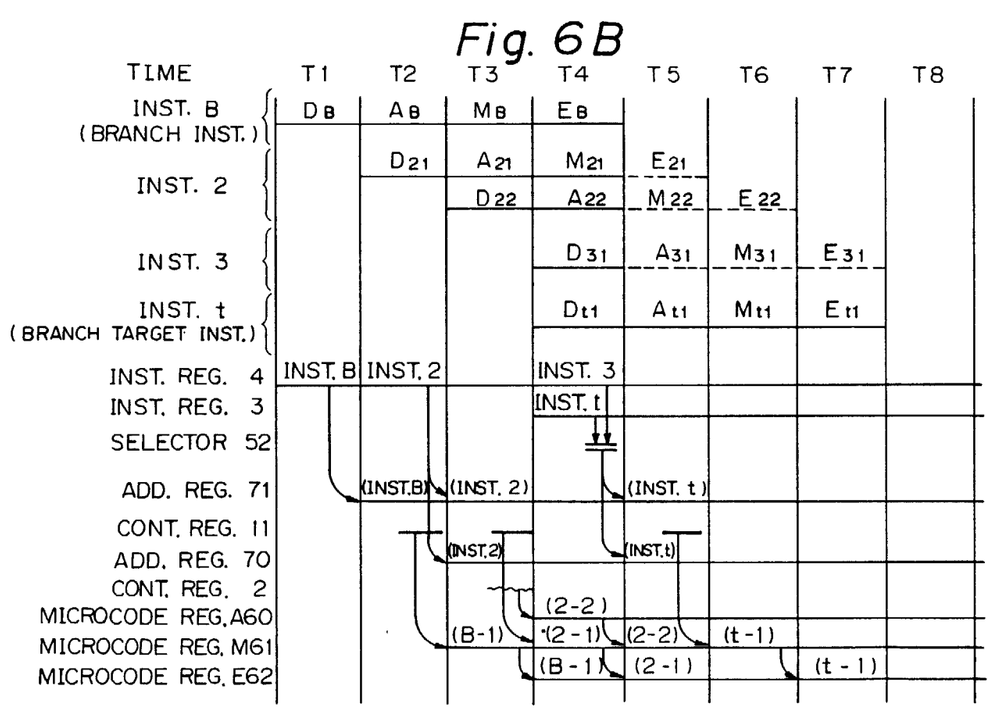
Figure 6C:
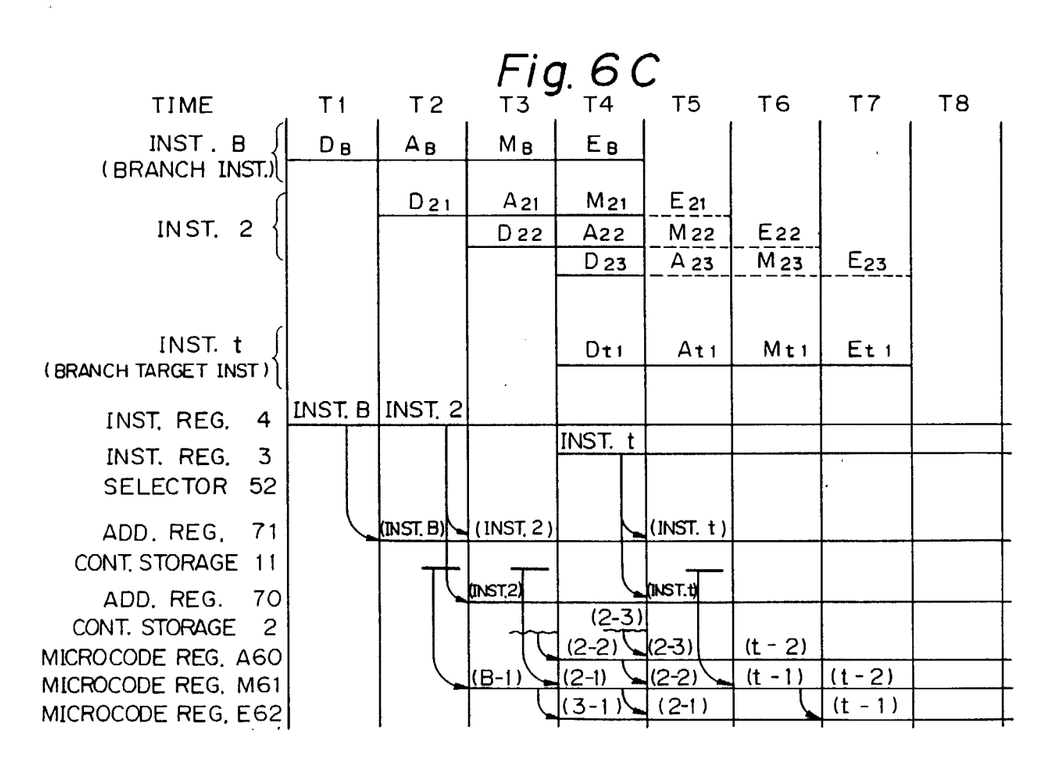

The following is an explanation with reference to FIG. 5, FIGS. 6B, and 6C of an operation of the system when processing the branch machine instruction (instruction B).

In this case, the operations at times T1 and T2 are the same as that of an ordinary machine instruction. Namely, in the branch instruction, only a microcode instruction (B-1) of the first step is executed.

At the time T1, a stage DB of the branch instruction set in the instruction register 3 is executed. Concretely, an operation code of the branch instruction is set in the address register 71 to generate an address for the first control storage 11.

At the next time T2, a stage AB of the branch instruction and the stage D (stage D21) of the first step of the next instruction 2 set in the instruction register 4 are executed. In addition, in the stage AB, the microcode instruction (B-1) is read from the first control storage 11, as shown by a bold line, and the microcode is then set to the microcode register M(61) to control the next stage.

Further, the stage D (stage D21) of the first step of the instruction 2 is execution, i.e., an operation code of the instruction 2 is set in the address register 71, and simultaneously, an address of the control storage for the second step is generated at the address generator 6 and is set in the address register 70.

At the time T3, in a stage MB of the branch instruction, the branch target instruction (hereinafter referred as an instruction t) is picked up from the main storage device and is set in the instruction register 3.

In stage A (stage A21) of the instruction 2, the microcode (2-1) of the first step of the instruction 2 is read from the first control storage 11, as shown by a bold line, and is set to the microcode register M(61) to control the next stage.

Further, in stage D22 of the innstruction 2, the microcode (2-2) of the second step is read from the second control storage 2, as shown by a wavy line, and is set to the microcode register A(60) to control the next stage.

At the next time T4, a stage EB of the branch instruction is executed and the result of the branch condition decision is sent to the selector 52.

At this time, the stage D31 of the instruction 3 previously set in the instruction register 4 is executed and the operation code of the instruction 3 is prepared for setting in the address register 71. If the branch is executed, the information (instruction t) in the instruction register 3 is sent to the address register 71 and the address generator 6, and if the branch is not executed, the information (instruction 3) in the instruction register 4 is sent thereto. Thus, the branch target instruction (instruction t) does not interfere with the instruction 3. The execution of the instruction t is initiated from the stage EB of the branch instruction.

The above explanation concerns an operation when the instruction 3 is set in the instruction register 4 at the time T3 at which the instruction t is set in the instruction register 3. On the other hand, an operation when, for example, the address of the control storage in the third step of the instruction 2 is set at the same time T3 in the address register 70 through the address generator 6, is shown in FIG. 6C.

As shown in FIG. 6C, a read (stage D23) of a microcode (2-3) of the third step of the instruction 2 from the second control storage 2 and storage an address for the control storage 11 in a microcode (t-1) of the first step of the instruction t in the address register 71, are initiated at the same time T4. The microcode (2-3) of the third step of the instruction 2 is read at the time T4, as shown by a wavy line, and is set to the microcode register A(60). On the other hand, the microcode (t-1) of the first step of the instruction t sets the address of the control storage to the address register 71 at the stage Dt1, and simultaneously, the address of the control storage of the second step (if any) is set to the address register 70 through the address generator 6.

If an address of a microcode (2-4) of the fourth step of the isntruction 2 is generated, interference occurs in the address generator 6. Nevertheless, at the time T4, since the branch condition is decided, either the second step of the branch target instruction (instruction t) or the fourth step of the instruction 2 is supplied to the address generator in response to the branch condition decision, and thus interference is avoided.

Therefore, if the branch is decided, at the time T5, the microcode instruction (t-1) of the first step of the instruction t is read from the first control storage 11 and is set to the microcode register M (61), and the microcode (t-2) of the second step is read from the second control storage 2 and is set in the microcode register A(60). Subsequently, the respective microcodes (t-1, t-2) are shifted to the microcode registers M(61) and E(62), and the stages M and E are executed. As a result, the branch target instruction (instruction t) does not interfere with the general instruction (instruction 2), and the instruction t initiates the execution of the branch instruction from the stage EB thereof.

As described above, the embodiments of the invention have the following features. Namely, the microcode instructions of the first steps of the machine instruction are stored in the duplexed first and second control storages, the microcodes of the second step and thereafter are stored in a simplexed control storage, and the microcodes of the first step of the branch target instruction are read from only the first control storage in the duplexed storage. Moreover, the microcodes of the first steps of the machine instruction are stored in the first control storage, the microcdes of the second step and thereafter are stored in the second control storage, the first control storage is read at the second stage of the first step of the machine instruction, and the second control storage is controlled to read at the first stage of the second step and thereafter of the machine instruction. Then, at the time a decision is made about the branch condition of the branch instruction, the results of the reading of the microcodes of the first steps of the branch target instruction and the general instruction are selected, or the addresses of the microcodes of the first steps of the branch instruction and the general instruction are selected. Further, the readings from the control storages of the microcode of the first step of the branch target instruction and the microcode of the general instruction do not occur simultaneously.

We claim:

1. A microcode instruction reading control system, comprising:
   a first instruction register for holding a machine instruction;
   a first control storage device for storing at least one microcode instruction of each machine instruction, the device being accessed by an address from a portion of the machine instruction held in the first instruction register;
   a pipeline processor for processing the microcode instruction in stages and in parallel with another microcode instruction, each microcode instruction being processed sequentially in a plurality of processing stages, said pipeline processor prefetching a branch target machine instruction before a branch condition is decided in a microcode instruction processing a branch machine instruction;
   a second instruction register for holding the prefetched branch target machine instruction;
   a second control storage device for storing at least a first microcode instruction of each machine instruction, the second control storage device being accessed by an address from a portion of the branch target machine instruction set in the second instruction register, access to the second control storage device by the branch target machine instruction and access to the first control storage device by the machine instruction following the branch instruction being processed in parallel;

selection means for selecting one of the microcode instructions of said first and second control storage devices responsive to a branch result when a branch condition of the branch instruction is decided.

2. A microcode reading control system as set forth in claim 1, wherein said pipeline processor has at least the following four stages comprising:

first stage means for reading the microcode from the control storage device;

second stage means for calculating an address to access data storage devices including a main storage device and buffer storage;

third stage means for accessing the main storage device or the buffer storage; and fourth stage means for executing an operation, and when the branch instruction is processed in the first stage means, in the second stage means, an address for the branch target machine instruction is calculated, in the third stage means, the branch target machine instruction is fetched, and in the fourth stage means, the branch condition is decided.

3. A microcode reading control system, comprising:

a first instruction register for holding a machine instruction;

a first control storage device for storing at least one microcode isntruction of each machine instruction, the device being accessed by an address from a portion of the machine instruction held in the first instruction register;

a pipeline processor for processing the microcode instruction in stage and in parallel with another microcode instruction, each microcode instruction being processed sequentially in a plurality of processing stages, said pipeline processor prefetching a branch target machine instruction before a branch condition is decided in a microcode instruction processing a branch machine instruction;

a second instruction register for holding the prefetched branch target machine instruction;

a second control storage device for storing at least a first microcode instruction of each machine instruction, the second control storage device being accessed by an address from a portion of the branch target machine instruction set in the second instruction register, access to the second control storage device by the branch target machine instruction and access to the first control storage device by the machine instruction following the branch instruction being processed in parallel;

selection means for selecting one of the microcode instructions of said first and second control storage devices responsive to a branch result when a branch condition of the branch instruction is decided;

said pipeline processor having at least the following four stages comprising:

first stage means for reading the microcode from the control storage device;

second stage means for calculating an address to access data storage devices including a main storage device and buffer storage;

third stage means for accessing the main storage device or the buffer storage; and fourth stage means for executing an operation;

when the branch instruction is processed in the first stage means, in the second stage means, an address for the branch target machine instruction is calculated, in the third stage means, the branch target machine instruction is fetched, and in the fourth stage means, the branch condition is decided;

a third control storage device for storing the microcode instructions other than the first microcode instruction of each machine instruction;

an address generator for supplying an address for reading the third control storage, the address generator receiving an output of the selector and an output of the third control storage, and, said pipeline processor comprises a first register for executing second stage processing, a second register for executing third stage processing, a third register for executing fourth stage processing, said registers being cascade-connected, and the pipeline processor receiving the output of the selector in the first stage and receiving the output of the third control storage in a stage other than the first stage.

4. A microcode instruction reading control system, comprising:

a first instruction register for holding a machine instruction;

a second instruction register for holding a branch target machine instruction;

selection means for selecting an output from either of the first and second instruction registers;

a first control storage device receiving an output of the selection means as an address and supplying stored microcode instructions corresponding to a first step of executing the machine instruction and the branch target machine instruction;

a second control storage device receiving the output of the selection means as an address and supplying stored microcode instructions corresponding to steps other than the first step of the machine instruction and the branch target machine instruction;

a pipeline processor having a first register, a second register, and a third register connected in cascade, the first register receiving an output of the second control storage, the second register receiving an output of the first control storage, each microcode instruction being performed in first, second, third, and fourth stage means, the first stage means being controlled by the output of the selection means, the second stage means being controlled by the output of the control storage or an output of the first register, the third stage means being controlled by an output of the second register, and the fourth stage being controlled by an output of the third register.

5. A microcode reading control system as set forth in claim 4, wherein in the first stage means, the microcode instruction is read from the second control storage device to the first register, in the second stage means, the microcode instruction is read from the control storage device to the second register or an address for accessing a main storage device including buffer storages is calculated, in the third stage means, the main storage device is accessed, and in the fourth stage means, an operation designated in the microcode instruction is executed, and when the branch instruction is processed, in the second stage means, an address of the branch target machine instruction is calculated, in the third stage means, the branch target machine instruction is fetched to the second instruction register, and in the fourth stage means, the branch condition is decided causing said selection means to select an output of one of the first instruction register and the second instruction register.

6. An apparatus, comprising:
- a pipeline processor for executing machine instructions in accordance with microcode programs corresponding to each machine instructions where each microcode program includes microcode instructions including first and second microcode instructions, and for currently executing a branch machine instruction to produce a branch result;
- a first register coupled to said processor and holding a machine instruction following the branch machine instruction;
- a first control storage coupled to said first register, storing the first microde instructions and outputting one of the first microcode instructions corresponding to the machine instruction;
- a second register coupled to said processor and holding a branch target machine instruction of the branch instruction;
- a second control storage coupled to said second register, storing the first microcode instructions and outputting on eof the first microcode instructions corresponding to the branch target machine instruction; and
- a selector, coupled to aid first control storage said second control storage and said processor, for selecting the output of the first or second control storages responsive to the branch result.

7. An apparatus as recited in claim 6, wherein said first control storage stores the second microcode instructions.

8. An apparatus as recited in claim 6, further comprising a third control storage coupled to said processor for storing the second microcode instructions.

* * * * *

UNITED STATES PATENT AND TRADEMARK OFFICE
CERTIFICATE OF CORRECTION

PATENT NO. : 4,933,841
DATED : June 12, 1990
INVENTOR(S) : Tsuyoshi Mori et al.

It is certified that error appears in the above-identified patent and that said Letters Patent is hereby corrected as shown below:

Col. 1, line 11, "ARt" s/b --Art--;
line 54, "interface" s/b --interfere--.

Col. 3, line 55, "microcide" s/b --microcode--.

Col. 4, line 27, "instruction" s/b --instructions--;
line 41, "sstep" s/b --step--;
line 50, "A General" s/b --A general--.

Col. 5, line 34, "target instruction in" s/b --target machine instruction of--;
line 35, "branch machine instruction of" s/b --branch instruction--.

Col. 7, line 55, "storage" (2nd occurrence) s/b --stores--;

Col. 12, line 8, "on eof" s/b --one of--;
line 12, "aid" s/b --said--.

Signed and Sealed this

Eighth Day of October, 1991

Attest:

HARRY F. MANBECK, JR.

*Attesting Officer*  *Commissioner of Patents and Trademarks*